United States Patent [19]

Oborny et al.

[11] Patent Number: 5,766,723
[45] Date of Patent: Jun. 16, 1998

[54] FASTENER ASSEMBLY WITH PERIPHERAL SEAL

[75] Inventors: Louis F. Oborny, Kansas City, Mo.; Kevin G. Kangas, Chamblee, Ga.; James C. Tran, Overland Park, Kans.

[73] Assignee: Woodbridge Foam Corporation, Mississauga, Canada

[21] Appl. No.: 747,209

[22] Filed: Nov. 12, 1996

[51] Int. Cl.⁶ .................................................. A44B 21/00
[52] U.S. Cl. .......................... 428/100; 428/99; 428/120; 428/194; 428/900; 24/442
[58] Field of Search ........................... 428/99, 100, 900, 428/194, 120; 24/442, 444

[56] References Cited

U.S. PATENT DOCUMENTS

| | | | |
|---|---|---|---|
| 4,470,857 | 9/1984 | Casalou | 156/66 |
| 4,563,380 | 1/1986 | Black et al. | 428/100 |
| 4,617,214 | 10/1986 | Billarant | 428/40 |
| 4,693,921 | 9/1987 | Billarant et al. | 428/100 |
| 4,710,414 | 12/1987 | Northrup et al. | 428/43 |
| 4,726,975 | 2/1988 | Hatch | 428/100 |
| 4,784,890 | 11/1988 | Black | 428/100 |
| 4,802,939 | 2/1989 | Billarant et al. | 156/155 |
| 4,814,036 | 3/1989 | Hatch | 156/245 |
| 4,842,916 | 6/1989 | Ogawa et al. | 428/100 |
| 4,933,035 | 6/1990 | Billarant et al. | 156/155 |
| 5,171,395 | 12/1992 | Gilcreast | 156/500 |
| 5,180,618 | 1/1993 | Kessler | 24/444 |
| 5,500,268 | 3/1996 | Billarant | 428/100 |

*Primary Examiner*—Alexander Thomas
*Attorney, Agent, or Firm*—Fitzpatrick, Cella, Harper & Scinto

[57] ABSTRACT

A fastener assembly capable of being molded into a cushion, the fastener assembly comprising: (i) a backing layer and (ii) a fastening layer opposed to one another, the backing layer comprising anchor means to secure the fastener assembly to the cushion, the fastening layer comprising a touch fastening surface spaced inwardly from the marginal edges of the fastening layer to define a peripheral margin around the fastening layer, and (iii) a foam seal disposed on the peripheral margin, the foam seal having an Indentation Force Deflection, when measured pursuant to ASTM D3574-95, in the range of from about 10 to about 1000 pounds.force. A process for producing the fastener assembly and a cushion describing the fastener assembly are also disclosed.

28 Claims, 10 Drawing Sheets

FASTENER ASSEMBLY WITH PERIPHERAL SEAL

BACKGROUND OF THE INVENTION

1. Field of the Invention

In one of its aspects, the present invention relates to a fastener assembly with a peripheral seal. More particularly, the present invention relates to a fastener assembly which may advantageously be molded into a cushion and used to secure a cover material to the cushion. In another of its aspects, the present invention relates to a process for producing a fastener assembly. In yet another of its aspects, the present invention relates to a cushion comprising a fastener assembly.

2. Description of the Prior Art

In the art of adhering or securing cover materials to cushion elements, it is known to utilize a mechanical fastener assembly to adhere a cover material to a cushion element.

One particular class of cushion elements comprises isocyanate-based polymer foams. Isocyanate-based polymer foams are known in the art. Generally, those of skill in the art understand isocyanate-based polymer foams to be polyurethane foams, polyurea foams, polyisocyanurate foams and mixtures thereof.

It is also known in the art to produce isocyanate-based polymer foams by a variety of techniques. Indeed, one of the advantages of isocyanate-based polymers compared to other polymer systems is that polymerization and foaming can occur in situ. This results in the ability to mold the polymer while it is forming and expanding.

One of the conventional ways to produce an isocyanate-based polymer foam, such as a polyurethane foam, is known as the "one-shot" technique. In this technique, the isocyanate, a suitable polyol, a catalyst, water (which acts as an indirect, reactive blowing agent and can optionally be supplemented with one or more blowing agents) and other additives are mixed together at once in a suitable mixer to produce a liquid foamable composition. The liquid foamable composition and is then expanded and/or molded to produce polyurethane foam. Generally, if one were to produce a polyurea, the polyol would be replaced with a suitable polyamine. A polyisocyanurate may result from cyclotrimerization of the isocyanate component. Urethane-modified polyurea foam or polyisocyanurate foam are known in the art. In either scenario, the reactants would be intimately mixed very quickly using a suitable mixer.

When it is desired to utilize a mechanical fastener to adhere a cover material to the isocyanate-based polymer foam, it is known to place the mechanical fastener in the mold such that it is molded into the finished foam product. Generally, a conventional mechanical fastener comprises a touch fastening surface. As used throughout this specification, the term "touch fastening surface" is intended to mean a surface which will adhere to a complementary surface on the cover material to be adhered to the cushion element. Practically, the touch fastening surface has taken the form of one half of a "hook and loop" fastener system. This type of touch fastening surface has gained commercially popularity due to its reliability and separability after initial adhesion. In other words the touch fastening surface comprises a plurality of hook elements and the cover material comprises a plurality of loop elements, or vice versa, such that the hook elements and loop elements mechanically engage one another when pressed into contact. Generally, it has been preferred to have the hook elements on the mechanical fastener molded in the cushion element and the loop elements on the cover material to be adhered to the cushion element. Alternatively, the touch fastening surface may be an adhesive which, upon contact, will adhere to an appropriate cover material.

Conventionally, the mechanical fastener is placed in the mold such that the touch fastening surface is flush against a surface of the mold (usually the mold surface is provided with a trench for receiving the touch fastening surface of the mechanical fastener)—i.e. such that the touch fastening surface is exposed in the finished foam product. When utilizing such a mechanical fastener in a mold for producing an isocyanate-based polymer foam, specific care must be taken to avoid fouling of the touch fastening surface of the mechanical fastener with the liquid foamable composition which is dispensed into the mold. Fouling of the touch fastening surface can occur as a result of the liquid nature of the foamable composition, together with the generally above-ambient pressure conditions within the mold. Specifically, these pressure conditions within the mold tend to drive the liquid foamable composition into any available cracks and crevices which may be present between the touch fastening surface and the mold surface.

Thus, much attention in the prior art has been devoted to development of mechanical fasteners which are designed to obviate or mitigate fouling of the touch fastening surface by ingress of the liquid foamable composition.

The conventional approach has been to place a temporary, removable tape/film over the touch fastening surface of the mechanical fastener. During polymerization and expansion of the liquid foamable composition, the tape/film inhibits fouling of the touch fastening surface. After production of the foam cushion element with the mechanical fastener molded therein, the tape/film may then be removed. This type of mechanical fastener is still the predominant system in current commercial use. Notwithstaning this, the system is disadvantageous since the cost of the mechanical fastener is increased by the need for the tape and significant labor expense is incurred in removal of the tape/film after production of the foam cushion element.

The prior art has attempted to overcome these disadvantages using a number of different approaches.

U.S. Pat. No. 4,784,890 [Black], the contents of which are hereby incorporated by reference, teaches a tapeless fastener assembly with a peripheral temporary attachment layer. Specifically, the elongate fastener assembly taught in this patent comprises a pair of longitudinally extending strips containing ferromagnetic particles which, when placed in the vicinity of magnets in the mold, purportedly seal the hook elements in the fastener assembly from ingress of liquid foamable composition. Generally, the temporary attachment layer is a binder containing iron particles, the binder coated on the longitudinal edges of the fastener assembly. The fastener assembly may contain a seal at the ends thereof. In one embodiment, this end seal contains ferromagnetic particles and is ultrasonically staked to the backing layer of the fastener, thereby necessitating: (i) the use of additional magnets in the mold (i.e. retooling), and/or (ii) significant material and labor cost to place two specially designed end seals for each fastener assembly.

U.S. Pat. No. 4,842,916 [Ogawa et al.], the contents of which are hereby incorporated by reference, teaches a tapeless fastener assembly. Specifically, the elongate fastener assembly taught in this patent comprises a pair of longitudinally extending strips containing a sealing member. The sealing member can be fibrous, resinous or a foam. This fastener assembly is disadvantageous since there is no disclosure or suggestion of a provision for sealing the ends of the assembly. The present inventors have determined that failure to seal the ends of the fastener assembly results in significant fouling of the touch fastening surface.

U.S. Pat. No. 5,500,268 [Billarant], the contents of which are hereby incorporated by reference, teaches a tapeless fastener assembly with magnetic side and end seals. The side seals comprise a flexible sheeting material containing magnetically attractable powder. The fastener assembly comprises a plurality of hook members on the fastening surface. The end seals are simply a small portion of loop material located at each end of the fastening surface. This fastener assembly is disadvantageous for a number of reasons. First, the use of magnetically attractable side seals necessitates the use of additional magnets in the mold (i.e. retooling). Second, the ends seals must be very carefully placed since reliance is placed on the "hook and loop" engagement provide a seal against ingress of liquid foamable composition. Third, the combination of side seals and end seals does not provide a complete, continuous seal around the periphery of the hook members on the fastening surface. Fourth, the end seals are generally deficient since they are designed to be located in the trench in the mold (FIG. 5), while the seals are intended to be located out of the trench and against the mold surface. Fifth, the use of end seals which comprise hook members facilitates fouling of the touch fastening surface due to the difficulty in compressing the hook (or loop) members to provide an adequate seal.

See also the following references:

U.S. Pat. No. 4,470,857 [Casalou];
U.S. Pat. No. 4,563,380 [Black et al];
U.S. Pat. No. 4,617,214 [Billarant];
U.S. Pat. No. 4,693,921 [Billarant];
U.S. Pat. No. 4,710,414 [Northrup et al.];
U.S. Pat. No. 4,726,975 [Hatch];
U.S. Pat. No. 4,802,939 [Billarant];
U.S. Pat. No. 4,814,036 [Hatch];
U.S. Pat. No. 4,933,035 [Billarant]; and
U.S. Pat. No. 5,171,395 [Gilcreast];

the contents of each of which are hereby incorporated by reference.

Despite all of these attempts in the prior art to improve mechanical fasteners, the result is that the mechanical fastener of this type in widespread commercial use is the one comprising a temporary, manually removable tape over the touch fastening surface of the mechanical fastener.

It would be desirable to have a mechanical fastener which reduces or overcomes one or more of the above-identified disadvantages of the prior art. It would also be desirable if such an improved mechanical fastener could be readily produced and used in existing molds.

SUMMARY OF THE INVENTION

It is an object of the present invention to provide a novel mechanical fastener which obviates or mitigates one or more of the above-mentioned disadvantages of the prior art.

It is another object to provide a novel process for producing a mechanical fastener.

It is yet another object of the prior art to provide a novel cushion comprising a mechanical fastener.

Accordingly, in one of its aspects, the present invention provides a fastener assembly capable of being molded into a cushion, the fastener assembly comprising:

(i) a backing layer and (ii) a fastening layer opposed to one another, the backing layer comprising anchor means to secure the fastener assembly to the cushion, the fastening layer comprising a touch fastening surface spaced inwardly from the marginal edges of the fastening layer to define a peripheral margin around the fastening layer, and (iii) a foam seal disposed on the peripheral margin, the foam seal having an Indentation Force Deflection, when measured pursuant to ASTM D3574-95, in the range of from about 10 to about 1000 pounds.force.

In another of its aspects, the present invention provides, a process for producing a fastener assembly comprising the steps of:

(i) providing an elongate fastening layer comprising a plurality of hook members disposed substantially orthogonal to and spaced inwardly from the longitudinal marginal edges of the fastening layer to define a pair of longitudinal margins substantially free of the hook members;

(ii) removing at least two sections of the plurality of hook members, each section being substantially transverse to the longitudinal marginal edges, to define a peripheral margin around the touch fastening surface, the peripheral margin being substantially free of touch fastening surface;

(iii) adhering a foam seal to the peripheral margin.

In yet another of its aspects, the present invention provides a cushion comprising a substrate body and a fastener assembly molded into a surface of the cushion, the fastener assembly comprising:

(i) a backing layer and (ii) a fastening layer opposed to one another, the backing layer comprising anchor means to secure the fastener assembly to the cushion, the fastening layer comprising a touch fastening surface spaced inwardly from the marginal edges of the fastening layer to define a peripheral margin around the fastening layer, and (iii) a foam seal disposed on the peripheral margin, the foam seal having an Indentation Force Deflection, when measured pursuant to ASTM D3574-95, in the range of from about 10 to about 1000 pounds.force.

Thus, the present inventors have discovered an improved fastener assembly having a foam seal disposed along a peripheral margin of the fastening layer, the foam seal having an Indentation Force Deflection (IFD), when measured pursuant to ASTM D3574-95, in the range of from about 10 to about 1000 pounds.force. Specifically the fastening layer has a touch fastening surface spaced inwardly from all marginal edges of the fastening layer to define a peripheral margin substantially completely free of touch fastening surface. Provision of such a foam seal having the above-mentioned IFD along this peripheral margin results in a fastener assembly which significantly eliminates most (if not all) fouling of the touch fastening surface during molding into the cushion.

Preferably, the foam seal is substantially non-magnetically attractable (i.e. the foam is magnetically inert). In this embodiment, if a magnetically attractable element is used to facilitate positioning of the fastener assembly in sealing engagement with the mold, it is preferred that the magnetically attractable element not be disposed in the seal portion of the fastener assembly (i.e. in contrast to the approach used by Black and Bilarant '268 discussed hereinabove). Specifically, it has been discovered that, when a magnetically attractable member is disposed in the present fastener assembly independent of the foam seal (e.g. incorporated in one or both the backing layer and the fastening layer, or disposed between the backing layer and the fastening layer and the like), the performance of the foam seal in preventing fouling of the touch fastening surface is improved. This is believed to occur as a result of: (i) the compressive force being applied across substantially the entire thickness of the seal; (ii) avoiding use of metal in the seal to provide a low firmness, compressible seal, (iii) the ability to utilize the body of the fastener assembly to compress the foam seal against the mold surface producing an improved seal while eliminating the possibility that magnetic forces will separate the seal from the fastener assembly (e.g. as a result of pulling on a magnetically attractable seal). Thus, in one embodiment, the magnetically attractable member may be a magnetically attractable metal layer disposed between the backing layer and the fastening layer. In another embodiment, the magnetically attractable member may be a magnetically attractable metal disposed in the fastening layer. In this embodiment, the magnetically attractable metal, inter alia, may be in the form of particulate metal molded into the fastening layer or it may be in the form of a wire mold in or otherwise affixed to the fastening layer. In yet another embodiment, the magnetically attractable member comprises a magnetically attractable metal disposed in the backing layer. Thus, if one considers the foam seal to have a mold abutment surface and a fastening layer abutment surface, it is preferred the magnetically attractable metal (if present) be disposed away from and not form part of the foam seal. The result of this feature is that, when the present fastener assembly is placed in the vicinity of one or more magnets appropriately located in the mold, substantially the entire body of the fastener assembly compresses the foam seal to the mold thereby providing an improved seal with the mold (i.e. compared with urging the seal only against the mold).

BRIEF DESCRIPTION OF THE DRAWINGS

Embodiments of the present invention will be described with reference to the accompanying drawings, wherein like numerals refer to like parts and in which.

DETAILED DESCRIPTION OF THE PREFERRED EMBODIMENTS

Figure 1:
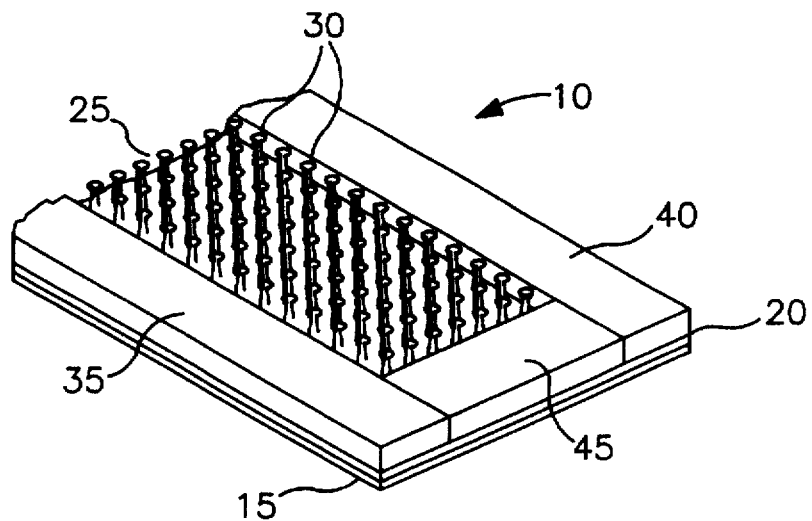
FIG. 1 illustrates a perspective view of a portion of an embodiment of the present fastener assembly.

With reference to FIG. 1, there is illustrated a fastener assembly 10. Fastener assembly 10 comprises a backing layer 15 and a fastening layer 20. Fastening layer 20 comprises a touch fastening surface 25 which consists of a plurality of hook members 30 spaced inwardly from all marginal edges of fastening layer 20. Spacing in of hook members 30 in this manner defines a peripheral margin on fastening surface 25. Disposed on this peripheral margin are a pair of longitudinal foam seals 35,40. An end foam seal 45 is provided in the portion of the peripheral margin between longitudinal foams seals 35,40. The other end of fastener assembly 10 (not shown) comprises a similar foam end seal.

Figure 2:
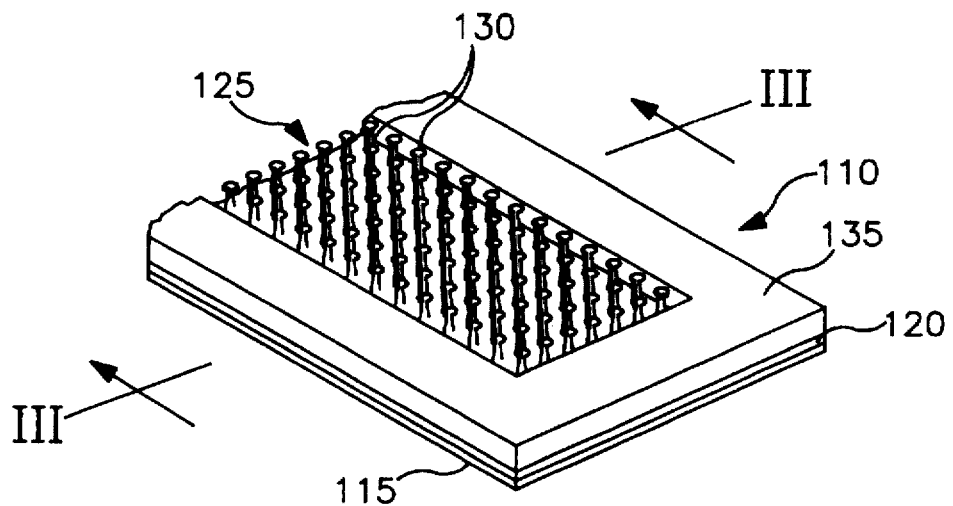
FIG. 2 illustrates a perspective view of a portion of another embodiment of the present fastener assembly.

With reference to FIG. 2, there is illustrated a fastener assembly 110. Fastener assembly 110 comprises a backing layer 115 and a fastening layer 120. Fastening layer 120 comprises a touch fastening surface 125 which consists of a plurality of hook members 130 spaced inwardly from all marginal edges of fastening layer 120. Spacing in of hook members 130 in this manner defines a peripheral margin on fastening layer 120. Disposed on this peripheral margin is an integral foam seal 135 which is disposed along the entire periphery of fastening layer 120, including the other end (not shown) of fastening layer 120.

Figure 3A:
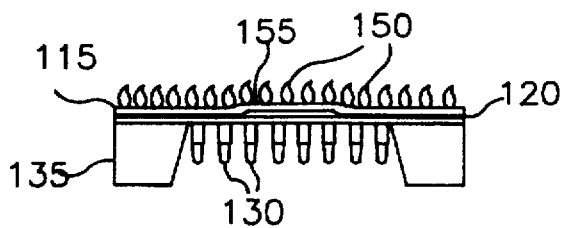
FIG. 3A is a sectional view along line III—III of FIG. 2.

With reference to FIG. 3A, it can be seen that backing layer 115 of fastener assembly 110 comprises a plurality of loop members 150. Further, interposed between backing layer 115 and fastening layer 120 is a magnetically attractable strip 155.

Figure 3B:
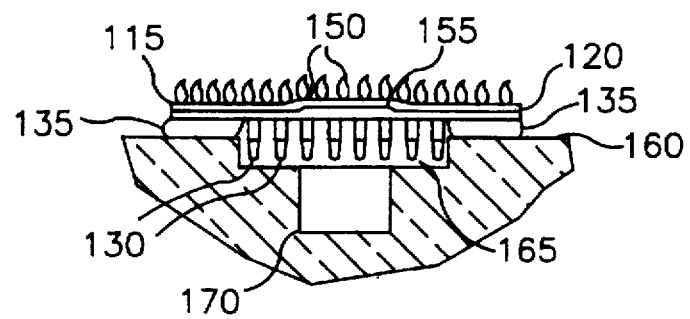
FIG. 3B illustrates the fastener assembly illustrated FIG. 3A urged against a surface of a mold.

With reference to FIG. 3B, fastener assembly 110 illustrated in FIGS. 2 and 3A is illustrated in use. Specifically, fastener assembly 110 is placed against a mold surface 160 such that foam seal 135 contacts mold surface 160. As illustrated, mold surface 160 further comprises a trench 165 adapted and dimensioned to receive hook members 130 of fastening layer 120. Trench 165 comprises a magnet 170 positioned below a point corresponding generally to where magnetically attractable strip 155 will be located. As illustrated, magnet 170 attracts magnetically attractable strip 155 which serves to urge the entire surface of fastening layer 120 against mold surface 160. This interaction results in compression of foam seal 135 to provide a highly desirable seal which substantially reduces and, in certain cases, eliminates ingress of foamable composition into trench 165 and thereafter to touch fastening surface 125. Thus, foam seal 135 is compress along the periphery of trench 165 rather than having a portion thereof located in trench 165.

A particularly preferred aspect of the embodiment illustrated in FIG. 3B is compression of foam seal 135 as a result of urging of substantially the entire surface of fastening layer 120 toward mold surface 160. This approach is more preferred to utilizing magnetically attractable particles in foam seal 135. Thus, it has been discovered that a particularly advantageous seal is formed when foam seal 135 has an Indentation Force Deflection (IFD) when measured pursuant to ASTM D3475-95, in the range of from about 10 to about 1.000, preferably from about 10 to about 500, more preferably from about 10 to about 250, most preferably from about 10 to about 100, pounds.force. The precise nature of foam seal 135 is not particularly restricted provided that it have the requisite IFD. Preferably, foam seal 135 is comprised of polyurethane foam. The precise nature of useful polyurethane foams is not particularly restricted—see "Flexible Polyurethane Foams" by Herrington et al. (1991), the contents of which are hereby incorporated by reference. A particularly useful polyurethane foam is commercially available from Woodbridge Foam Corporation under the tradename ES150.

Figure 4A:
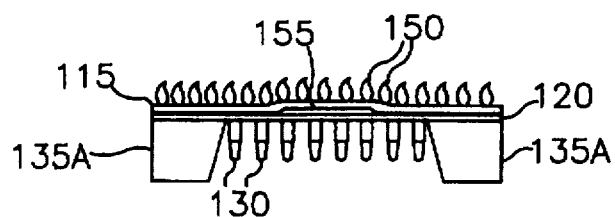
FIG. 4A is a sectional view of a fastener assembly modified from that illustrated in FIG. 3A.
Figure 4B:
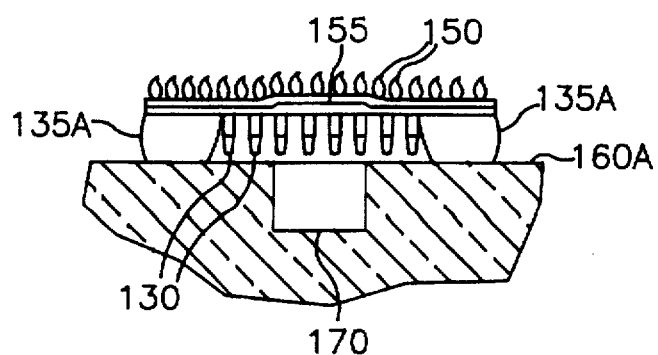
FIG. 4B illustrates the fastener assembly illustrated FIG. 4A urged against a surface of a mold.

With reference to FIGS. 4A and 4B, there is illustrated a fastener assembly slightly modified from the one illustrated in FIGS. 3A and 3B. Specifically, foam seal 135A in FIGS. 4A and 4B has a height greater then hook members 130 on fastening layer 120. The result of this is mold surface 160A is not required to have a trench (similar to trench 165 in FIG. 3B) to receive hook members 130 of fastening layer 120.

Otherwise, the fastener assembly illustrated in FIGS. 4A and 4B can be used in substantially the same manner as the one illustrated in FIGS. 3A and 3B.

Thus, once the fastener assembly is located in and urged against the mold surface, a liquid foamable composition may be dispensed into the mold and expanded to produce a cushion comprising a substrate body having a surface comprising the present fastener assembly molded therein. A particularly advantageous feature of the present fastener assembly is that the foam seal disposed along the periphery of the fastening layer facilitates adhesion of the fastener assembly to the substrate body of the cushion by "locking in" the foamable composition as it expands to produce the substrate body of the final cushion product. This feature reduces product failures where the fastener assembly is not properly secured to the substrate body.

The seal against ingress of liquid foamable composition to touch fastening surface of the fastening layer is achieved, at least in part, by the provision of a peripheral margin on the fastening layer defined by spacing end of the touch fastening surface from the marginal edges of the fastening layer. This facilitates provision of a continuous seal around the periphery of the fastening layer which mitigates or obviates fouling of the touch fastening surface due to ingress of the liquid foamable composition.

The precise nature of the backing layer, the fastening layer, the touch fastening surface and the magnetically attractable strip (if present) is not particularly restricted—see, for example the various United States patent references referred to above and incorporated herein by reference.

In a preferred embodiment of the present fastener assembly, various elements may be integral. Thus, for example, the backing layer and the fastening layer may be integrally formed such that the anchor means in the backing layer can be a plurality of integral loops, mushrooms and the like. Alternatively, the backing layer and the fastening layer may be integrally formed such that the anchor means in the backing layer can be a magnetically attractable element conformed to facilitate engagement of the fastener assembly to the cushion. Of course, the backing layer may be an independent element such as a fibrous or non-fibrous material. Non-limiting examples of fibrous materials include at least one member selected from the group consisting essentially of glass fibres (e.g. in the form of a cloth or a mat, chopped or unchopped, such as Nico 754 1 oz/ft$^2$), polyester fibres, polyolefin fibres (e.g. polyethylene and polypropylene), Kevlar fibres, polyamides fibres (e.g. nylon), cellulose fibres (e.g. burlap), carbon fibres, cloth materials such spun bound polyesters (e.g. Lutravil 1DH7210B/LDVT222 and Freudenberg PTLD585G/PTLD600B), nylon and paper (e.g. Kraft #60). For certain such fibrous materials (e.g. paper), the anchor means may be integral in the fibrous material. It will be appreciated that the fibrous reinforcing layer may be woven or non-woven. Non-limiting examples of a non-fibrous materials comprise at least one member selected from the group consisting essentially of thermosets (e.g. polyurethanes, polyesters and epoxies), metals such as aluminum foil, polycarbonates (e.g. Lexan and Dow Calibre), polycarbonate/ABS alloys (e.g. Dow Pulse), ABS terpolymers (e.g. Royalite 59 and Dow Magnum), polyester terphthalate (PET), vinyl, styrene maleic anhydride (e.g. Arco Dylark), and fibreglass reinforced polypropylene (e.g. Azdel). If such fibrous materials are used in the backing layer, it may be appropriate, in certain cases, to modify the materials to comprise anchor means to facilitate engagement of the fastener assembly to the cushion. It will be appreciated that many non-fibrous materials may themselves be reinforced with fibrous materials and thus, the backing layer may be a combination of fibrous and non-fibrous materials, either mixed or composite in construction.

Figure 5:
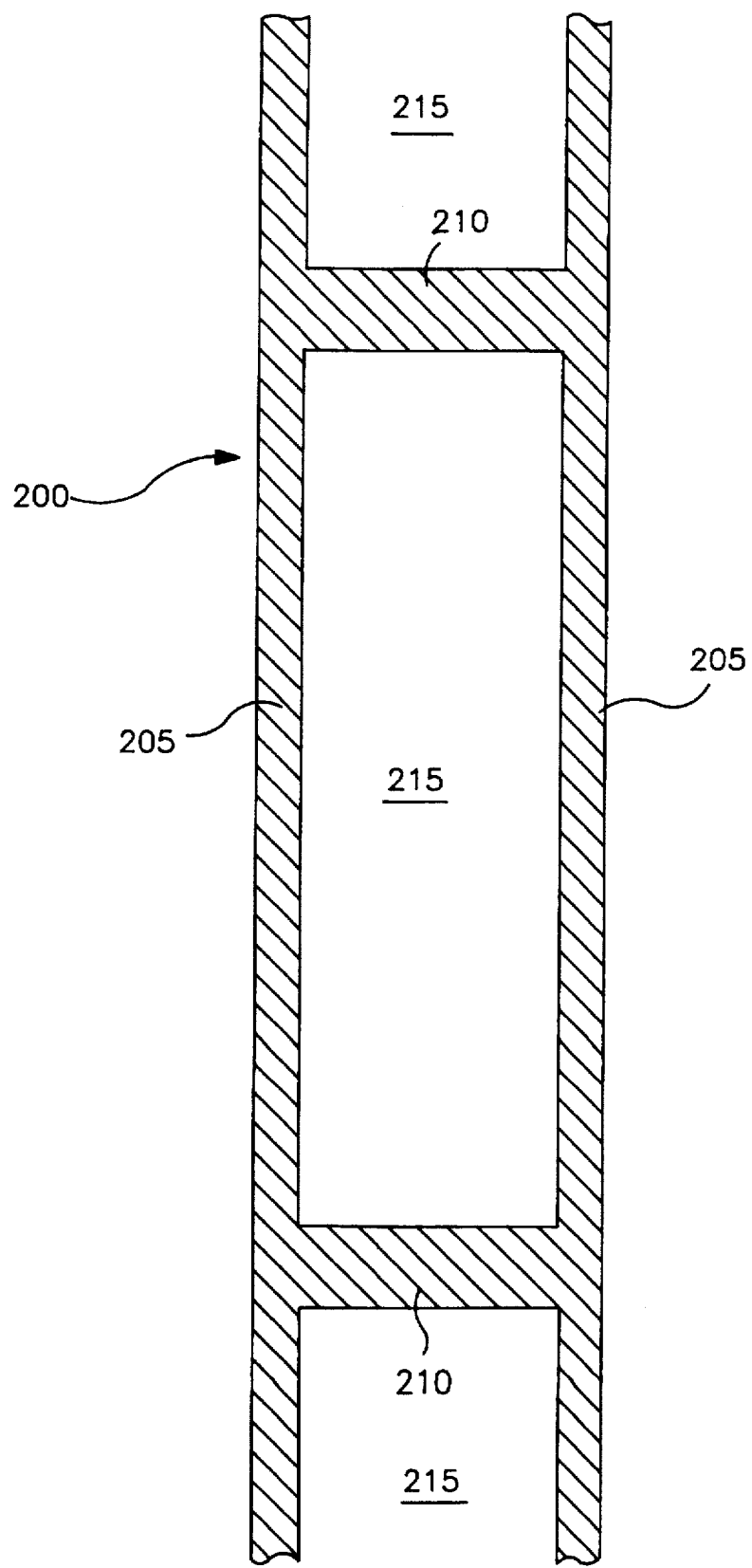
FIGS. 5–7 illustrate a schematic of the fastener assembly illustrated in FIG. 2 at various points along a process embodiment for production thereof.
Figure 6:
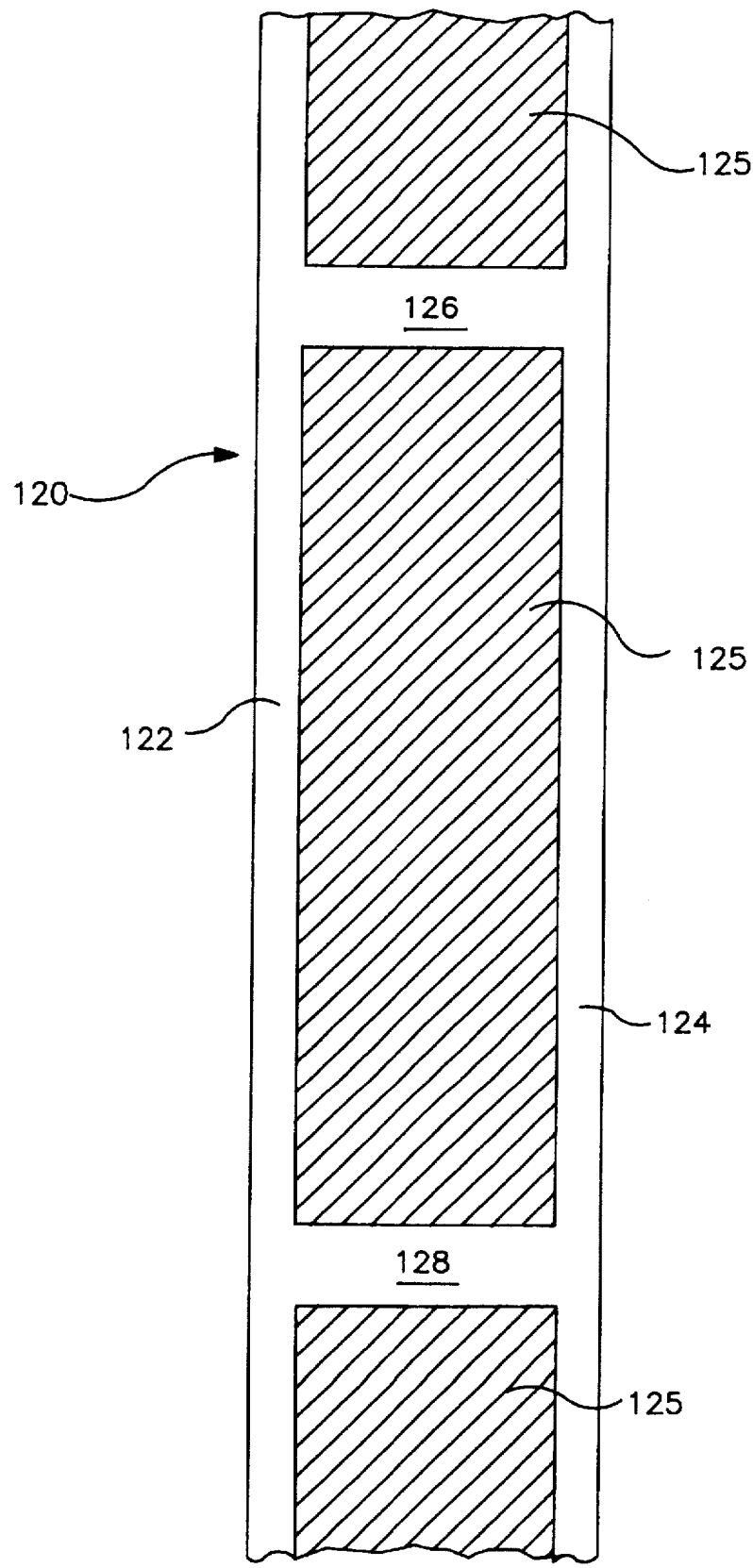
Figure 7:
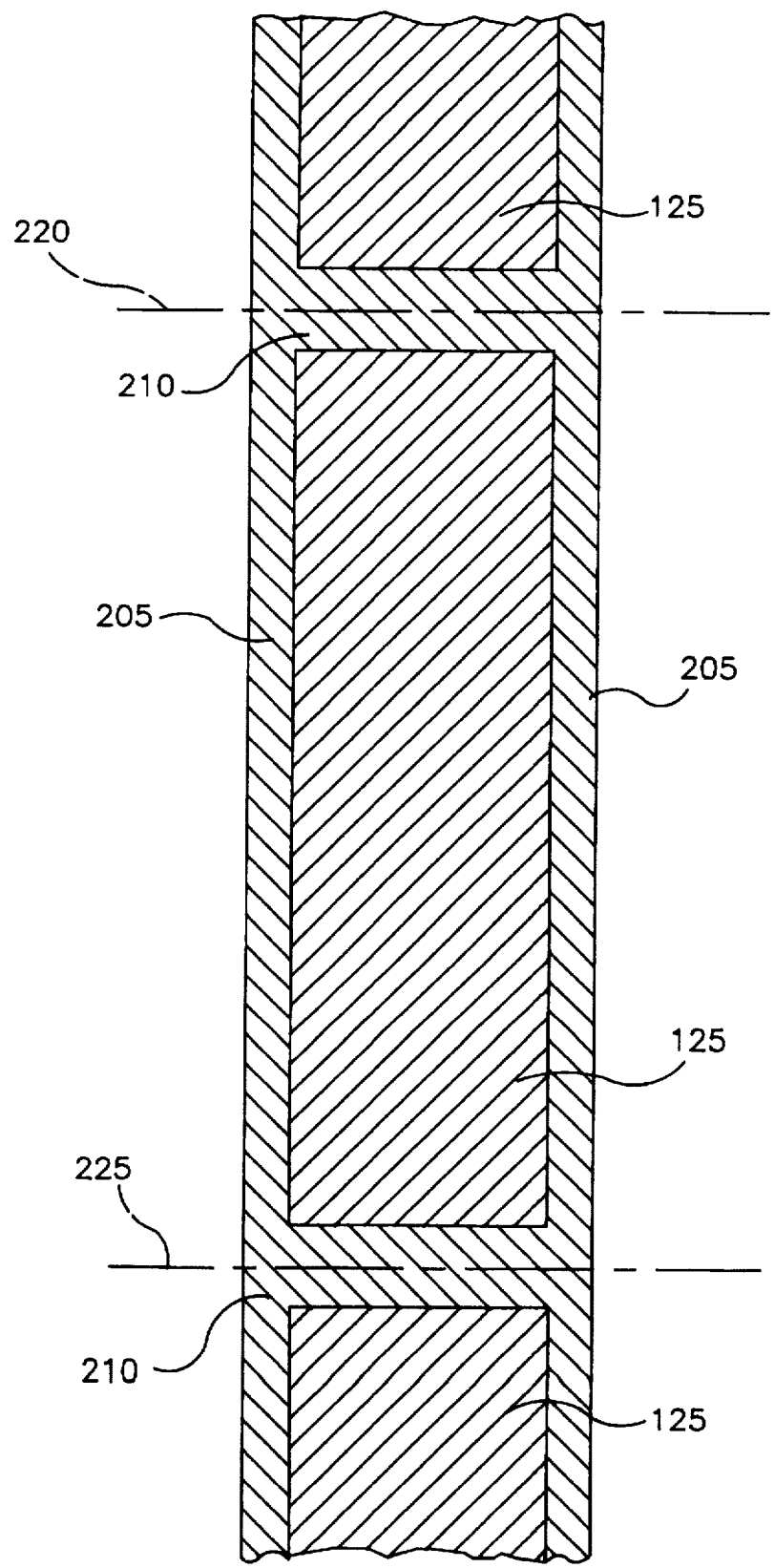

With reference to FIGS. 5–7, a preferred process for the production of fastener assembly 110 illustrated in FIGS. 2, 3A and 3B will now be discussed. Initially, a supply of foam having a thickness equal to that desired for foam seal 135 is obtained. The width of this foam feedstock should be substantially the same as the width of fastener assembly 110. This foam feedstock is fed to a die cutting station resulting in the production of die cut foam 200. Die cut foam 200 comprises longitudinal foam elements 205 and transverse foam elements 210. The provision of elements 205,210 defines a plurality of die cut openings 215. The dimensions of die cut opening 215 are preselected such that they correspond to the dimensions of the touch fastening surface in fastener assembly 110 which is to be produced.

With reference to FIG. 6, there is illustrated a fastening layer 120. Fastening layer 120 comprises a pair of longitudinal margins 122,124 and a pair of transverse margins 126,128. Fastening layer 120 further comprises touch fastening surface 125 as discussed hereinabove. As illustrated in FIG. 6, touch fastening surface 125 is spaced inwardly from all marginal edges of fastening layer 120.

Practically, fastening layer 120 illustrated in FIG. 6 may be produced by starting with a feed material comprising touch fastening surface disposed on the entire surface and thereafter removing selected portions of touch fastening surface 125 to define longitudinal margins 122,124 and transverse margins 126,128. Alternatively, it is possible to produce fastening layer 120 with longitudinal margins 122, 124 intact and thereafter selectively remove portions of touch fastening surface 125 to define transverse margins 126,128. In either case, removal of selected portions of touch fastening surface 125 can be achieved by any convenient means. For example, if touch fastening surface 125 comprises a plurality of hook members, the hook members may be selectively removed by one or more of cutting, stamping, grinding, sanding and melting operations.

At this point, die cut foam 200 is positioned over fastening layer 120 such that elements 205,210 of die cut foam 200 are in alignment with longitudinal margins 122,124 and transverse margins 126,128, respectively. Die cut foam 200 is then adhered to fastening layer 120 using any convenient means. For example, die cut foam 200 may be adhered to fastening layer 120 by a suitable adhesive such as contact cement, hot melt adhesive, glue and the like.

Once die cut foam 200 has been adhered to fastening layer 120, a length of fastener assembly 110 is produced—see FIG. 7. At this point, individual fastener assemblies may be produced by cutting the overall length of fastener assembly 110 along lines 220,225. Such cutting can be achieved by conventional means.

Although not illustrated in FIGS. 5–7, backing layer 115 may be adhered to fastening layer 120 prior to or after (preferably prior to) adhesion of die cut foam 200 to fastener assembly 120.

The process described with reference to FIGS. 5–7 is particularly advantageous for entities who manufacture such fastener assemblies. The principal reason for this is that the foam die cut operation and fastening layer stamping or other similar operation which selectively removes a portion of the touch fastening surface may conveniently and conventionally be conducted in the same production line together with the adhesion and cutting operations.

With reference to FIGS. 8–12, the production of fastener assembly 10 will now be described.

Figure 8:
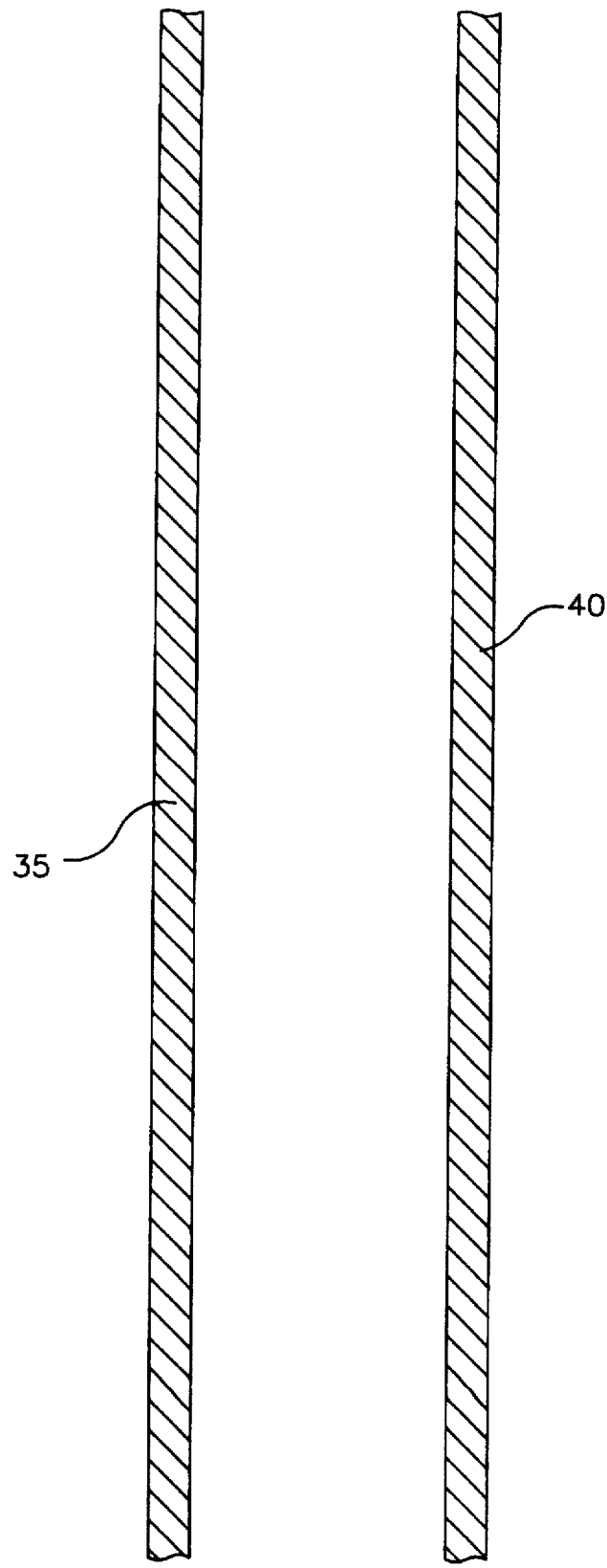
FIGS. 8–12 illustrate a schematic of the fastener assembly illustrated in FIG. 1 at various points along another process embodiment for production thereof.

A pair of longitudinal foam strips 35,40 may be obtained by any conventional means—see FIG. 8.

Figure 9:
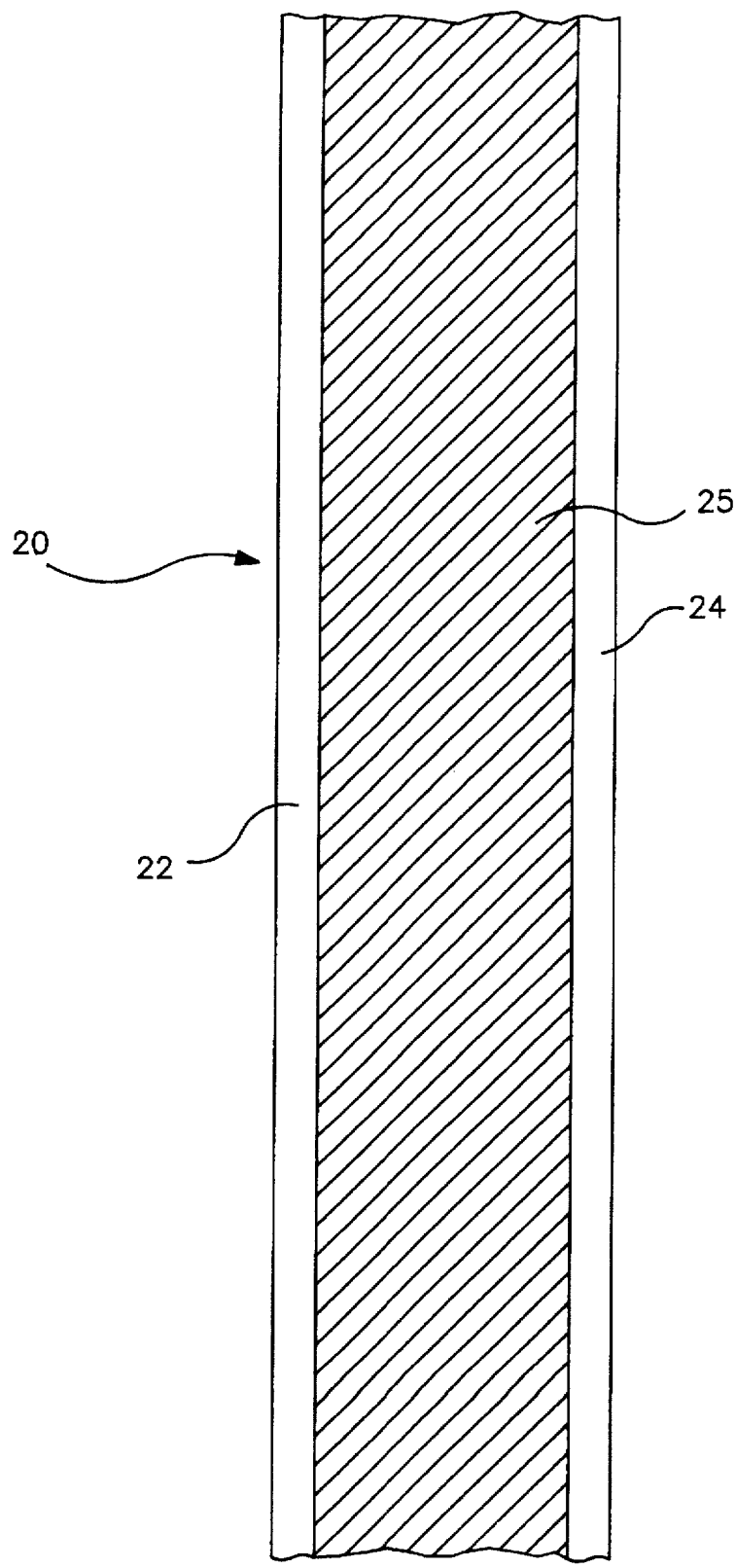

With reference to FIG. 9, fastening layer 20 is provided and comprises a pair of longitudinal margins 22,24. Fastening layer 20 further comprises touch fastening surface 25 which is spaced inwardly from the marginal edges of fastening layer 20 thereby defining longitudinal margins 22,24. As will be clear to those of skill in the art, longitudinal margins 22,24 are free of touch fastening surface 25. Fastening layer 20 with the provision of longitudinal margins 22,24 may be obtained as discussed above with respect to fastening layer 120 (FIGS. 5–7). Longitudinal foam strips 35,40 are adhered to longitudinal margins 22,24 of fastening layer 20, respectively. The manner by which adhesion is effected is not particularly restricted—see the foregoing discussion with respect to FIGS. 5–7. This results in production of a fastening layer comprising longitudinal foam seals 35 and 40 disposed at the longitudinal margins of fastening layer 20—see FIG. 10. As is evident, touch fastening surface 25 is spaced in from foam seals 35,40 the longitudinal margins of fastening layer 20.

Figure 11:
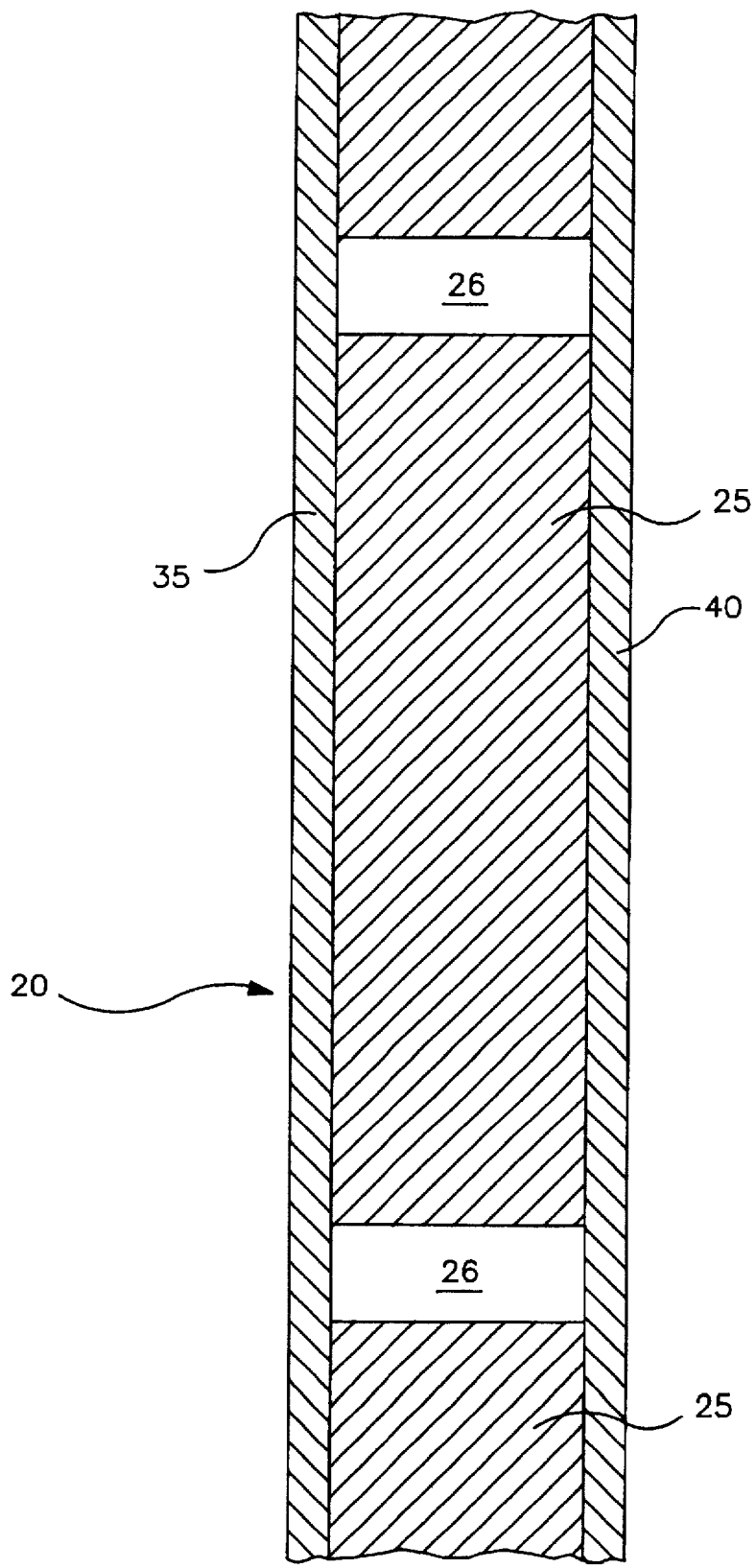

With reference to FIG. 11, transverse portions 26 are provided in fastening layer 20 by selective removal of portions of touch fastening surface 25. The removal of touch fastening surface 25 at desired locations may be effected as discussed hereinabove with reference to FIGS. 5–7.

Figure 12:
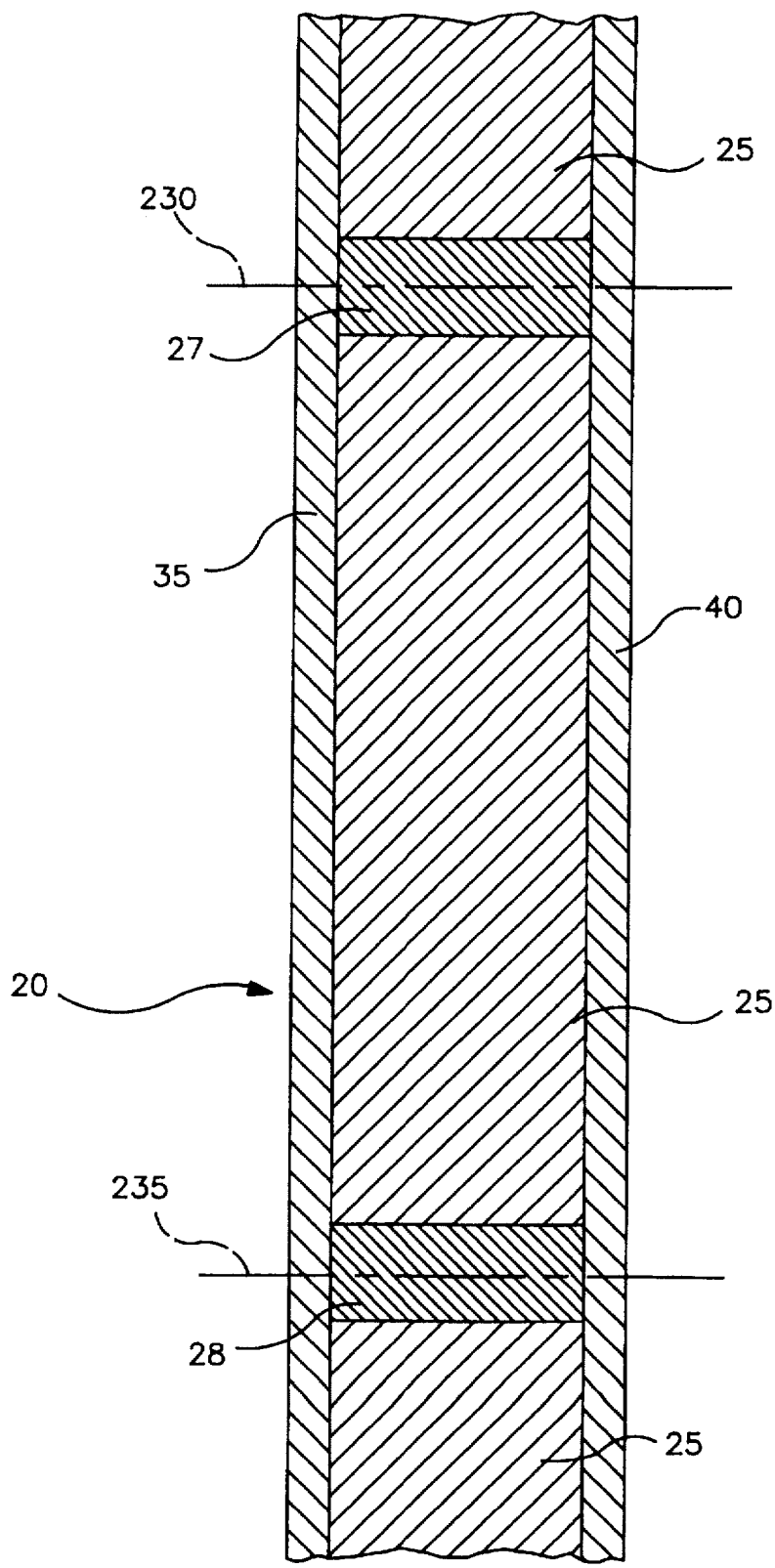

With reference to FIG. 12, a pair of foam seals 27,28 are adhered to portions 26 of fastening layer 20. Adhesion of foam seals 27,28 may be effected as discussed hereinabove. The results of this is an overall length of fastening assembly 10. Individual fastening assemblies may be obtained by cutting the overall length of fastener assembly 10 at lines 230,235. Such cutting can be effected in any conventional manner.

Figure 10:
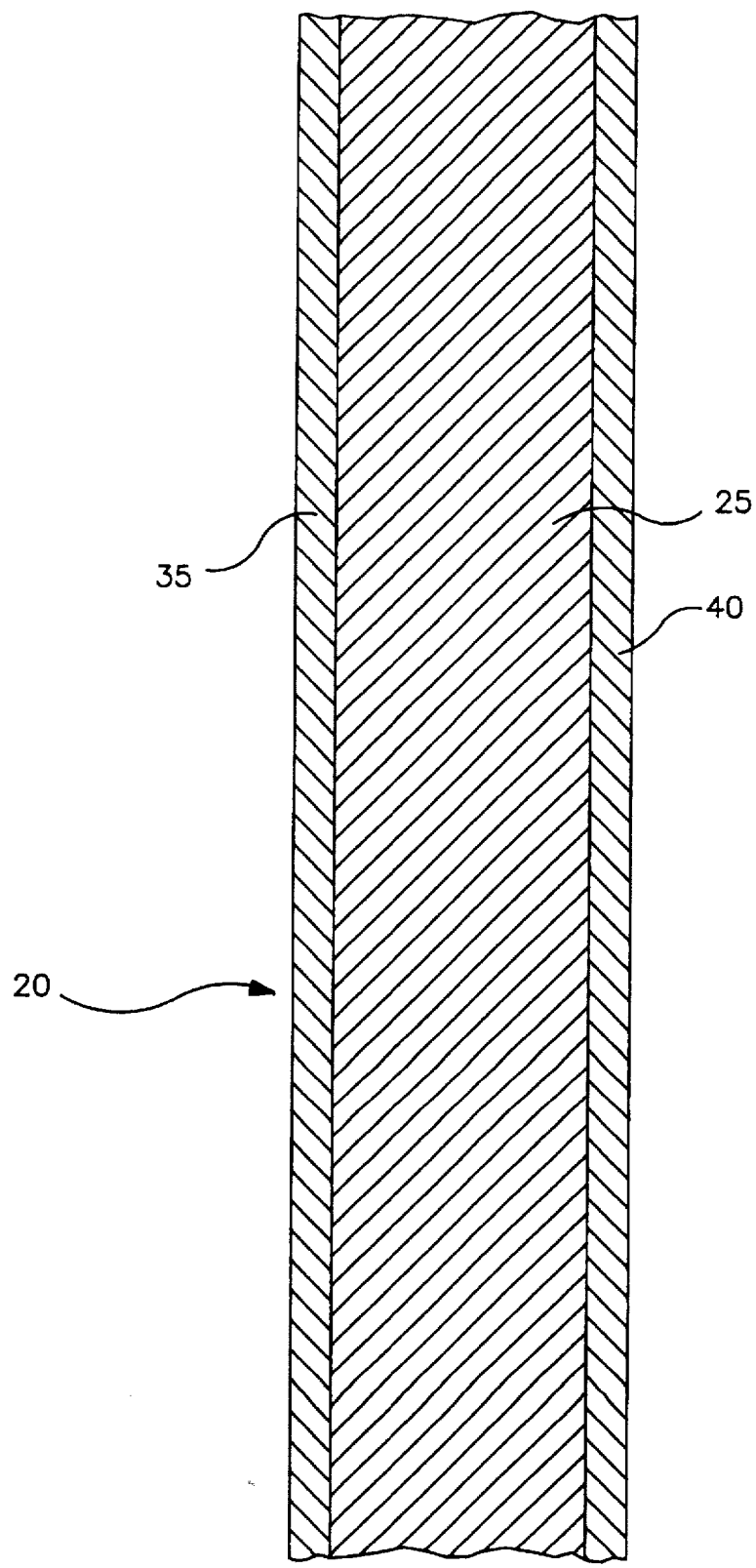

The process described with reference to FIGS. 8–12 is particularly advantageous since it allows the foam manufacturer to predetermine and select the overall length of each fastening assembly. Thus, the foam manufacturer may obtain fastening layer 20 as illustrated in FIG. 10 in bulk form and effect the process steps described with reference to FIGS. 11 and 12 to customize the length of each fastener assembly.

Again, fastening layer 20 may contain backing layer 15 prior to or after adhesion of the foam seals.

As will be appreciated by those of skill in the art, many variations of the disclosed process are possible without deviating from the spirit and substance thereof. Accordingly, while the invention has been described with reference to illustrative embodiments, the description is not intended to be construed in a limiting sense. Various modifications of the illustrative embodiments as well as other embodiments of the invention will be apparent to persons skilled in the art upon reference to this description. For example, those of skill in the art will be readily able to employ the illustrative embodiments in either a bulk production operation or a die cut production operation. It is therefore contemplated that the appended claims will cover any such modifications or embodiments.

What is claimed is:

1. A fastener assembly capable of being molded into a foam cushion in a mold having a trench, the fastener assembly comprising:

(i) a backing layer and (ii) a fastening layer opposed to one another, the backing layer comprising anchor means to secure the fastener assembly to the cushion, the fastening layer comprising a touch fastening surface having exposed fasteners and spaced inwardly from the marginal edges of the fastening layer to define a peripheral margin around the fastening layer, said peripheral margin being substantially free of fasteners, and (iii) a mold surface-engaging continuous foam seal disposed on the entire peripheral margin and having a continuous flat surface of substantially uniform height dimension to contact an entire outside of the mold trench to provide a continuous seal around the trench from the cushion foam, the foam seal being compressible and flexible and having an Indentation Force Deflection, when measure pursuant to ASTM D3574-95, in the range of from about 10 to about 1000 pounds.force.

2. The fastener assembly defined in claim 1, wherein the foam seal has an Indentation Force Deflection in the range of from about 10 to about 500 pounds.force.

3. The fastener assembly defined in claim 1, wherein the foam seal has an Indentation Force Deflection in the range of from about 10 to about 250 pounds.force.

4. The fastener assembly defined in claim 1, wherein the foam seal has an Indentation Force Deflection in the range of from about 10 to about 100 pounds.force.

5. The fastener assembly defined in claim 1, wherein the foam seal is an isocyanate-based foam.

6. The fastener assembly defined in claim 1, wherein the foam seal is a polyurethane foam.

7. The fastener assembly defined in claim 1, wherein the foam seal is integral.

8. The fastener assembly defined in claim 1, wherein the foam seal comprises a plurality of foam members.

9. The fastener assembly defined in claim 1, wherein the anchor means comprises a plurality of loop members.

10. The fastener assembly defined in claim 1, wherein the anchor means comprises a plurality of projections disposed substantially orthogonal to the backing surface.

11. The fastener assembly defined in claim 1, wherein the anchor means and the backing layer are integral.

12. The fastener assembly defined in claim 1, wherein the backing layer and the fastening layer are integral.

13. The fastener assembly defined in claim 1, wherein the anchor means comprises a fibrous surface.

14. The fastener assembly defined in claim 1, wherein the fibrous surface is woven.

15. The fastener assembly defined in claim 1, wherein the fibrous surface is selected from the group consisting of polyester, nylon and mixtures thereof.

16. The fawner assembly defined in claim 1, wherein the fibrous surface is non-woven.

17. The fastener assembly defined in claim 1, wherein the fibrous surfaces is cellulosic.

18. The fastener assembly defined in claim 1, wherein the foam seal is substantially non-magnetically attractable.

19. The fastener assembly defined in claim 1, further comprising magnetically attractable means for urging the foam seal against a surface in the vicinity of a magnet.

20. The fastener assembly defined in claim 19, wherein the magnetically attractable means comprises a magnetically attractable metal layer disposed between the backing layer and the fastening layer.

21. The fastener assembly defined in claim 19, wherein the magnetically attractable means comprises a magnetically attractable metal disposed in the fastening layer.

22. The fastener assembly defined in claim 21, wherein the magnetically attractable metal is in the form of particulate metal.

23. The fastener assembly defined in claim 21, wherein the magnetically attractable metal is in the form of a wire.

24. The fastener assembly defined in claim 19, wherein the magnetically attractable means comprises a magnetically attractable metal disposed in the backing layer.

25. The fastener assembly defined in claim 1, the touch fastening surface comprises a plurality of hook members disposed substantially orthogonal to the fastening layer.

26. The fastener assembly defined in claim 1, wherein the foam seal has a height less than the height of the plurality of hook members.

27. The fastener assembly defined in claim 1, wherein the foam seal has a height greater than the height of the plurality of hook members.

28. A cushion comprising a substrate body and a fastener assembly capable of being molded into a surface of the cushion in a mold having a trench, the fastener assembly comprising:

(i) a backing layer and (ii) a fastening layer opposed to one another, the backing layer comprising anchor means to secure the fastener assembly to the cushion, the fastening layer comprising a touch fastening surface having exposed fasteners and spaced inwardly from the marginal edges of the fastening layer to define a peripheral margin around the fastening layer, said peripheral margin being substantially free of fasteners, and (iii) a mold surface-engaging continuous foam seal disposed on the entire peripheral margin and having a continuous flat surface of substantially uniform height dimension to contact an entire outside of the mold trench to provide a continuous seal around the trench from the cushion foam, the foam seal being compressible and flexible and having an Indentation Force Deflection, when measure pursuant to ASTM D3574-95, in the range of from about 10 to about 1000 poundsnforce.

* * * * *